No. 11,957. Reissued Dec. 17, 1901.

J. H. THEBERATH & C. L. UHRY.

AUTOMATIC CATCH FOR BROOCHES, PINS, &c.

(Application filed Sept. 21, 1901.)

Witnesses.

L. Lee,

Walter H. Talmage.

Inventors.

J. H. Theberath and C. L. Uhry, per Thos. S. Crane, Atty.

UNITED STATES PATENT OFFICE.

JOHN HENRY THEBERATH, OF VAILSBURG, AND CHARLES L. UHRY, OF NEWARK, NEW JERSEY, ASSIGNORS TO BIPPART, GRISCOM & OSBORN, OF NEWARK, NEW JERSEY.

AUTOMATIC CATCH FOR BROOCHES, PINS, &c.

SPECIFICATION forming part of Reissued Letters Patent No. 11,957, dated December 17, 1901.

Original No. 676,640, dated June 18, 1901. Application for reissue filed September 21, 1901. Serial No. 76,119.

*To all whom it may concern:*

Be it known that we, JOHN HENRY THEBERATH, residing at Vailsburg, and CHARLES L. UHRY, residing at 144 Sherman avenue, Newark, county of Essex, State of New Jersey, citizens of the United States, have invented certain new and useful Improvements in Automatic Catches for Brooches and Pins of all Kinds, fully described and represented in the following specification and the accompanying drawings, forming a part of the same.

The object of the present invention is to furnish a catch for automatically engaging and locking the point of a pin-tongue when the tongue is pressed into such catch, such catch being held automatically in its engagement with the tongue until detached by the finger.

The improvement is adapted to brooches, lace-pins, and all kinds of pins which are secured upon the dress by a tongue and serves to lock the tongue, so as to positively prevent the loss of the brooch or pin.

In our construction the brooch is provided near the point of the tongue with forked guides, upon one of which a hook is pivoted so as to turn over the point of the tongue, and the base of the hook is provided with two projections, one of which forms a toe extended between the guides to be pressed by the point of the tongue, and the other forms an arm to be actuated by the finger for opening the hook. The tongue is preferably bent outward from the brooch at the middle, so as to press upon the dress when the brooch is applied thereto, and the mere pressure of the tongue into the guides serves to turn the hook over the outer side of the tongue, where the elastic pressure of the tongue is resisted and the tongue retained until the finger is applied to the arm and the hook turned outwardly. Such action of the finger permits the hook to escape elastically from the catch and enables the wearer to remove the brooch without any manipulation whatever of the tongue.

The invention is illustrated in one form in the annexed drawings, in which—

Figure 1:
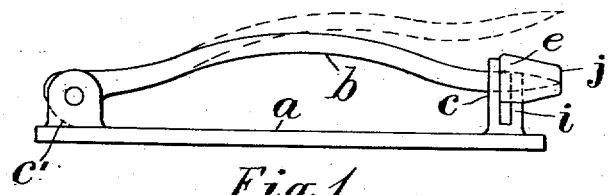
Figure 2:
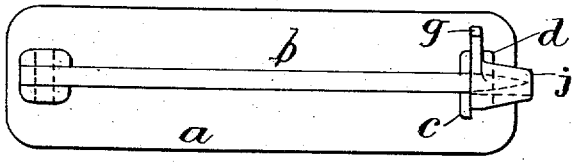
Figure 3:
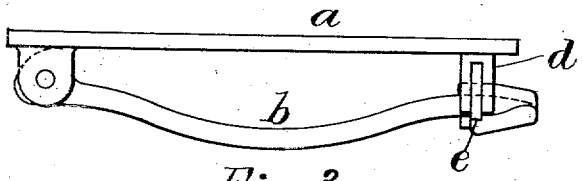
Figure 4:
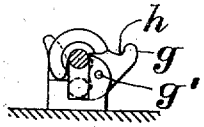
Figure 5:
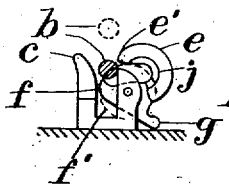
Figure 6:
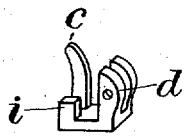
Figure 7:
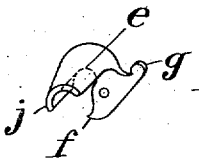

Figure 1 is an edge view of a brooch inverted and provided with the improvements with the pin shown in full lines locked by the catch and in dotted lines where it would be lifted by the elasticity conferred by its joint. Fig. 2 shows the back of the brooch. Fig. 3 is an edge view showing the side of the pin and catch opposite to that represented in Fig. 1. Fig. 4 shows the end of the brooch nearest the catch with the catch and tongue engaged. Fig. 5 is a similar view with the catch and tongue disengaged. Fig. 6 is a perspective view of the guides mounted upon a foot for attachment to the back of the brooch, and Fig. 7 is a perspective view of the catch-piece detached from the guides.

The figures are drawn upon a greatly-enlarged scale to show the details of construction, and a brooch or pin is represented by a plain flat plate *a*. The tongue *b* is shown pivoted to one end of the plate and provided with the usual heel *c'*, which causes its point to spring out elastically from the plate, as shown in dotted lines in Fig. 1. A guide *c* is shown at one side of the point and a guide *d* at the opposite side, the latter having a hook *e* pivoted therein transverse to the tongue and adapted to turn over the tongue, as shown in Fig. 4. A toe *f* is attached to the base of the hook and projects into the space between the guides, into which the tongue is directed by the sloping surface upon the guide *c*. Owing to the operation of the usual heel *c'* the point of the tongue lies normally above the path of the hook, as indicated by dotted lines in Fig. 1 and by the dotted circle connected with reference-letter *b* in Fig. 5. When the tongue is pressed into such space, its contact with the toe turns the hook upon its pivot until its point contacts with a seat or stop *i*, provided at the side of the guide *c*. In thus operating the tongue first contacts with the toe, as indicated by the hatched circle connected with the letter *b* in Fig. 5, and is pressed downward between the guides, as indicated by the dotted circle in Fig. 4. The release of the pressure upon the tongue throws it upward to the inner side of the hook, as indicated by the hatched circle inside the hook in Fig. 4. The end *e'* of the hook is a little nearer to the pivot than the arch of the hook, and the elastic pressure of the tongue upon the arch, as shown in Fig. 4, has therefore no tendency to turn the hook; but the latter is self-locked upon the tongue when it is once turned over the same. A dotted curved line is shown in Fig. 5 drawn tangent to the inner side of the end $e'$ and concentric with the pivot $g'$ of the hook, such dotted line extending across and within the arch of the hook and exhibiting clearly the inclination of the end $e'$ to the path of its movement, which is represented by such dotted line. The inclination of this end to its path of movement is such that it can slip over the tongue while the tongue is pressed outwardly upon the hook by its natural resilience. The single movement of turning the hook by pressure upon the arm $g$ thus enables the wearer to wholly discharge the tongue from its catch without any manipulation of the tongue. The path of movement of the extreme end of the toe $f$ is indicated in Figs. 4 and 5 by a dotted line $f'$ extending diagonally across the passage between the guides. An arm $g$ is projected from the base of the hook opposite to the toe $f$ and is provided with a notch $h$ to admit the finger-nail, which may be used to press the arm toward the brooch or plate $a$, and thus turn the hook open, as shown in Fig. 5. When the hook is thus turned, the tongue springs outwardly, as represented by dotted lines in Figs. 1 and 5, and is thus prevented from reëngaging the hook by accident. A shield $j$ is projected from the hook over the point of the tongue, such shield preventing the point from accidentally pricking the wearer or catching in the dress and preventing the easy removal of the article from the dress when the catch is disengaged. The tongue $b$ is shown bent outwardly from the body $a$ beyond the line of the fixtures which constitute the catch, so that the pin may be pressed against the dress without hindrance from the catch to make it turn the hook automatically. The point of the tongue may be thus locked without any manipulation whatever. It is common to bend the tongue of a brooch to make more room beneath the same to embrace the hair, scarf, or other objects in cases where no such automatic action of the pin is involved; but the bending of the tongue in the present construction is to perform a new and special function in connection with the automatic catch by bringing its middle portion outward beyond the catch, so as to receive the pressure of the garment when the brooch is put in place, and thus lock the tongue automatically and by mere pressure upon the front of the brooch.

We are aware that a staple-shaped or pivoted hook has been applied to the tongue of a brooch, but without means for turning it automatically, as in our construction. By forming the end of the hook $e'$ a little nearer to the pivot than the arch of the hook we prevent the tongue from turning the hook, while we secure a suitable inclination of the end to the path of its movement to press the tongue automatically inward as the hook is rotated, whereby the hook is not only self closed and locked upon the tongue when turned over the same, but is released from the tongue by the single operation of pressing upon the arm. We are also aware that the ordinary catch-hook upon a brooch has been provided with a safety-hook which turns over the inner side of the tongue when the tongue is placed inside of the catch-hook by the finger. In such construction the elastic pressure of the tongue holds it outwardly against the stationary catch-hook, and it does not, therefore, press at all against the safety-hook. Our construction differs from this in dispensing with the ordinary catch-hook and employing only the safety-hook and turning the same over the outer side of the tongue, where it will be firmly held by the elastic pressure of the tongue itself.

Having thus set forth the nature of the invention, what is claimed herein is—

1. A brooch having the hinged tongue $b$, the guides $c$, $d$, projected outwardly from the back of the brooch, with their passage-way in the plane of movement of the tongue to freely admit the point of the latter, and the hook $e$ pivoted upon one of the guides and having the toe $f$ extending from the base of the hook to project between the guides, and the arm $g$ projected from the base of the hook to extend outside of the guide for actuation of the finger, whereby the hook is automatically engaged with the outer side of the tongue by direct pressure upon the toe forcing it between the guides, and is elastically discharged from the guides by the mere pressure of the finger upon the arm $g$.

2. A brooch having the tongue $b$ with hinge for attaching it to the brooch, the catch herein described having guides projected outwardly from the brooch with passage-way in the plane of movement of the tongue, and the hook $e$ pivoted on one of the guides with toe extending from the base of the hook to project between the guides, and the tongue being bowed outwardly at the middle to contact with the dress, for pressing the tongue automatically into such catch to turn the hook over the tongue, substantially as herein set forth.

3. A brooch having the resilient hinged tongue $b$, two guides projected outwardly from the back of the brooch with their passage-way in the plane of movement of the tongue to freely admit the point of the latter, and a hook pivoted upon one of the guides and extending when closed across such passage-way, and having the toe $f$ projected from the hook between the guides, and an arm projected outside of the post to turn the hook, and the end $e'$ of the hook being formed a little nearer to the pivot than the arch of the hook to prevent the tongue from turning the hook, and suitably inclined to the path of its movement to slip over the resilient tongue while the tongue is pressing upon the hook, and operating to press the tongue inwardly as the hook is rotated, whereby the hook is self-closing, and is self-locked upon the tongue when it is once turned over the same, and is released from the tongue by the single operation of pressure upon the arm.

In testimony whereof we have hereunto set our hands in the presence of two subscribing witnesses.

JOHN HENRY THEBERATH.
CHARLES L. UHRY.

In presence of—
ACHILL BIPPART,
THOMAS S. CRANE.